(12) United States Patent
Bertucco et al.

(10) Patent No.: US 12,343,675 B2
(45) Date of Patent: Jul. 1, 2025

(54) APPARATUS AND METHOD FOR CLEANING METAL SMALLWARE

(71) Applicants: IFP Europe S.r.l., Galliera Veneta PD (IT); Università degli Studi di Padova, Padua (IT)

(72) Inventors: Alberto Bertucco, Padua (IT); Elena Barbera, Padua (IT); Giacomo Sabbadin, Galliera Veneta PD (IT)

(73) Assignees: IFP EUROPE S.R.L., Galliera Veneta (IT); UNIVERSITÀ DEGLI STUDI DI PADOVA, Padua (IT)

(*) Notice: Subject to any disclaimer, the term of this patent is extended or adjusted under 35 U.S.C. 154(b) by 20 days.

(21) Appl. No.: 18/164,072

(22) Filed: Feb. 3, 2023

(65) Prior Publication Data

US 2023/0249227 A1    Aug. 10, 2023

(30) Foreign Application Priority Data

Feb. 4, 2022  (IT) .................. 102022000002045

(51) Int. Cl.
*B01D 53/14* (2006.01)
*B01D 53/00* (2006.01)
(Continued)

(52) U.S. Cl.
CPC ....... *B01D 53/1406* (2013.01); *B01D 53/002* (2013.01); *B01D 53/18* (2013.01);
(Continued)

(58) Field of Classification Search
CPC ............ C23G 5/00–06; C23G 1/00–36; C23G 3/00–04; B08B 3/00–14; B01D 53/14; B01D 53/18
See application file for complete search history.

(56) References Cited

U.S. PATENT DOCUMENTS 4,983,223 A    1/1991 Gessner

FOREIGN PATENT DOCUMENTS

CN    111841246 A  * 10/2020
CN    214400737 U  * 10/2021
(Continued)

OTHER PUBLICATIONS

"Stripper," noun, Dictionary.com, available at https://www.dictionary.com/browse/stripper (Year: 2024).*
(Continued)

*Primary Examiner* — Eric W Golightly
*Assistant Examiner* — Richard Z. Zhang
(74) *Attorney, Agent, or Firm* — Lucas & Mercanti, LLP (57) ABSTRACT

A cleaning apparatus for metal smallware is provided having a washing chamber configured to carry out a washing cycle and suction means connected to the washing chamber and configured to carry out a discharge cycle, a main absorption column having a first side and a second side opposite each other, wherein the first side is hydraulically connected to the suction means and the second side is hydraulically connected to a supply duct. In particular, the main absorption column is configured to cause an interaction between a gaseous mixture supplied by the suction means and an absorption liquid supplied by the supply duct to perform chemical absorption of a solvent present in the gaseous mixture having air and solvent, in the absorption liquid, and reduce the concentration of solvent in the gaseous mixture having air and solvent.

5 Claims, 2 Drawing Sheets

(51) Int. Cl.
  *B01D 53/18*    (2006.01)
  *B01D 53/78*    (2006.01)
  *B08B 3/08*     (2006.01)
  *B08B 3/14*     (2006.01)
  *C23G 5/00*     (2006.01)
  *C23G 5/024*    (2006.01)
  *C23G 5/04*     (2006.01)

(52) U.S. Cl.
  CPC ............... *B01D 53/78* (2013.01); *B08B 3/08* (2013.01); *B08B 3/14* (2013.01); *C23G 5/00* (2013.01); *C23G 5/04* (2013.01); *C23G 5/024* (2013.01)

(56) References Cited

FOREIGN PATENT DOCUMENTS

| | | | |
|---|---|---|---|
| DE | 3614450 A1 | * | 11/1987 |
| GB | 273307 A | | 4/1928 |
| JP | S5825482 A | * | 2/1983 |
| JP | H10128049 A | | 5/1998 |

OTHER PUBLICATIONS

"Stripper," noun, Merriam-Webster Dictionary, available at https://www.merriam-webster.com/dictionary/stripper (Year: 2024).*

"Stripper, N. (1)." Oxford English Dictionary, Oxford UP, Jun. 2024, https://doi.org/10.1093/OED/8349072708. (Year: 2024).*

Search Report for Corresponding Italian Patent Application No. 202200002045, 16 pages, Sep. 28, 2022.

Visual Encyclopedia of Chemical Engineering Equipment, excerpt for the term "Strippers" (https://encyclopedia.che.engin.umich.edu/strippers/), pp. 1-10.

* cited by examiner

APPARATUS AND METHOD FOR CLEANING METAL SMALLWARE

CROSS-REFERENCE TO RELATED APPLICATIONS

This application claims the benefit of priority from Italian Patent Application No. 102022000002045, filed Feb. 4, 2022, the contents of which are incorporated herein by reference.

TECHNICAL SECTOR

The present invention relates in general to the sector of cleaning or washing apparatus for metal smallware and to a method for cleaning metal smallware. More particularly, the present invention relates to a cleaning apparatus and to a method for cleaning metal smallware, configured to limit the emission of solvent into the atmosphere.

PRIOR ART

At the end of various steps for machining metal smallware, or after use, said metal components may be covered with lubricant. The removal of the lubricant is necessary before subjecting the metal smallware to further production steps, before the placing on sale thereof, or for prolonging the working life of these components.

For this purpose cleaning apparatus are known, said apparatus being configured to perform a cycle for washing, i.e. cleaning, a batch of metal smallware soiled with lubricant.

In general, a cleaning apparatus comprises a washing chamber intended to perform a washing cycle. This operation requires the use of solvent in order to remove the lubricant from the surface of the metal smallware. At the end of the washing cycle, a gaseous mixture comprising air and solvent, namely a gaseous mixture of air having a certain amount of solvent dissolved in it, is produced as waste. Typically, the concentration of solvent in the gaseous mixture may reach values of about 6400 mg/Nm$^3$ or more.

This gaseous mixture is discharged from the washing chamber into the atmosphere via a vent or discharge outlet.

However, the emission of solvent into the atmosphere at the end of each washing cycle results in pollution and therefore places major limitations on the type and quantity of solvent which can be used during the washing cycle.

SUMMARY

The problem underlying the present invention is therefore to overcome the drawbacks of conventional solutions, allowing a reduction in the emission of solvent into the atmosphere.

The task of an apparatus for cleaning metal smallware and of a method for cleaning metal smallware according to the present invention is therefore to solve this problem.

In connection with this task, one object of the present invention is to provide a cleaning apparatus which is structurally simple.

A further object of the present invention is to ensure thorough cleaning of the metal smallware so as to ensure the substantial absence of machining residue and contaminants, namely machining residue and lubricants, other than metal. At the same time a further object is to maximize the reuse of the lubricant and to reduce, as far as possible, the emission thereof into the atmosphere and further machining residue.

This task, as well as these and other objects which will become clearer below are achieved by an apparatus for cleaning metal smallware and by a method for cleaning metal smallware according to the respective attached independent claims.

Detailed features of an apparatus for cleaning metal smallware and a method for cleaning metal smallware, according to the invention, are contained in the dependent claims.

Further characteristic features and advantages of the invention will emerge more clearly from the description of a preferred, but non-exclusive embodiment of a chain actuator for a window and a window comprising such actuator according to the invention, illustrated in an embodiment provided solely by way of a non-limiting example in the attached sets of drawings listed below.

BRIEF DESCRIPTION OF THE FIGURES

In the following detailed description of the invention reference will be made to the following figures of the attached drawings in which.

DETAILED DESCRIPTION

Figure 1:
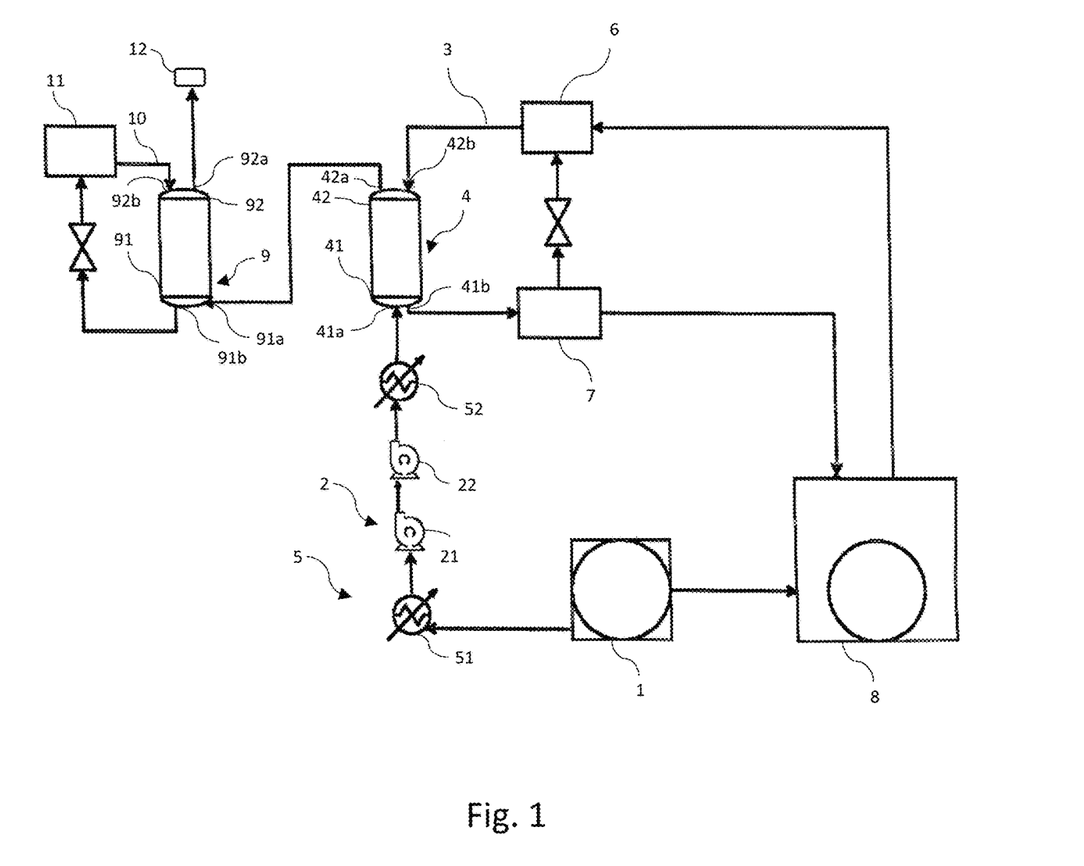
FIG. 1 shows a schematic illustration of the cleaning apparatus according to the present invention.
Figure 2:
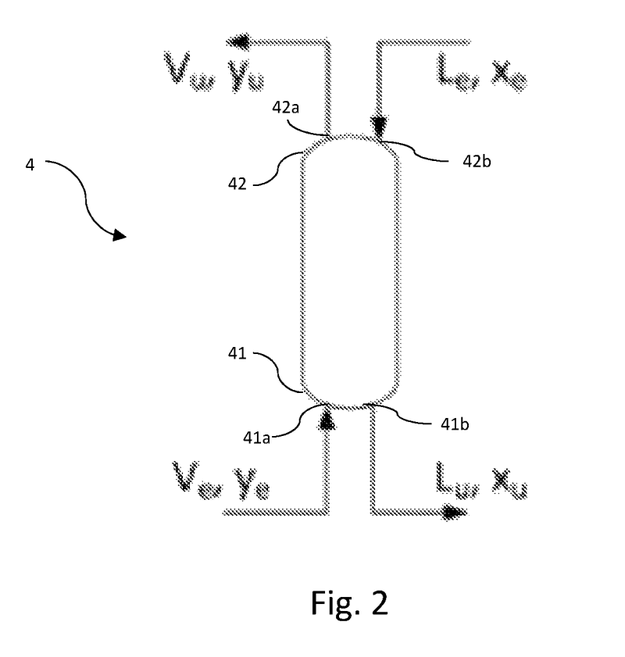
FIG. 2 shows a schematic illustration of the main absorption column 4 and the flows of gaseous mixture and liquid mixture entering into it and flowing out of it.

With particular reference to the attached figures, 100 denotes overall a cleaning apparatus for metal smallware.

In general, the expression "metal smallware" is understood as meaning metal components or elements, obtained by means of metal machining, for example turning or stock removal, having overall dimensions commonly ranging between 1 mm and 100 mm and more commonly ranging between 2 mm and 70 mm.

The cleaning apparatus 100 according to the present invention may comprise a washing chamber 1, which is conventional per se.

The washing chamber 1 may be apt to receive a solvent and at least one batch of metal smallware soiled with lubricant.

The washing chamber 1 may be configured to perform a washing cycle in order to remove at least part of the lubricant from the batch of metal smallware soiled with lubricant, by means of the solvent. In particular, during a washing cycle, a mixture of air and solvent may be produced as waste. The gaseous mixture produced at the end of the step a) may have a concentration of solvent of about 6400 mg/Nm$^3$. At the end of each washing cycle, the mixture of air and solvent must therefore be at least partially purified, so as to reduce the solvent content thereof before this gaseous mixture is released into the atmosphere.

The cleaning apparatus 100 according to the present invention may further comprise suction means 2 connected to the washing chamber 1. These suction means may be configured to perform a cycle for discharging the washing chamber 1, i.e. for sucking or drawing off the gaseous mixture comprising air and solvent from the washing chamber 1. Namely the suction means 2 may be configured to draw off the gaseous mixture comprising air and solvent from the washing chamber 1.

The cleaning apparatus 100 according to the present invention may comprise, furthermore, a main absorption column 4, having a first side 41, or first wall, and a second side 42, or second wall, opposite each other. In other words, the first side 41 and the secondi side 42 are facing each other, namely are arranged one opposite the other. The first side 41 may be hydraulically connected to the suction means 2 so as to receive the gaseous mixture comprising air and solvent and the second side 42 may be hydraulically connected to a supply duct 3 so as to receive from it an absorption liquid or a mixture comprising an absorption liquid. In other words, the first side 41 may be in fluid communication with the suction means 2, while the second side 42 may be in fluid communication with the supply duct 3, so as to receive respectively the gaseous mixture comprising air and solvent and an absorption liquid. In other words, during use, the main absorption column 4 may be supplied on the first side 41 with the gaseous mixture comprising air and solvent and on the second side 42 with an absorption liquid. Consequently, during use, the gaseous mixture comprising air and solvent and the absorption liquid, entering into the main absorption column 4 on two opposite sides, form a counter-flow. In this way, during use, the gaseous mixture comprising air and solvent and the absorption liquid enter on two opposite sides 41 and 42 of the main column 4.

In particular, the main absorption column 4 may be configured to cause an interaction between a gaseous mixture comprising air and solvent supplied by the suction means 2 and an absorption liquid supplied by the supply duct 3 so as to perform chemical absorption of a solvent present in the gaseous mixture comprising air and solvent, in the absorption liquid. The main absorption column 4 is, namely, configured to bring into contact with each other the gaseous mixture comprising air and solvent supplied by the suction means 2 and the absorption liquid supplied by the supply duct 3 so that material and heat exchanges may occur at the separation interface between the two phases, namely between the gaseous mixture comprising air and solvent and the absorption liquid, so as to obtain physical or chemical absorption of part of the solvent present in the gaseous mixture comprising air and solvent by means of the absorption liquid. Expressed in other words, the main absorption column 4 may be configured so that the interaction between the absorption liquid and the gaseous mixture comprising air and solvent causes absorption of a fraction of the solvent of the gaseous mixture comprising air and solvent by the absorption liquid, so as to obtain a reduction of the solvent in the gaseous mixture. In this way, the solvent is advantageously removed, at least partly, from the gaseous mixture. Consequently, before discharging of the gaseous mixture comprising air and solvent into the atmosphere, said mixture has a smaller concentration of solvent and therefore has a smaller environmental impact.

The degree of absorption of the solvent from the gaseous mixture comprising it by means of the absorption liquid depends on the chemical/physical properties of the components involved and on the dimensions of the main absorption column 4.

"Absorption liquid" is understood, therefore, in the context of the present invention as meaning a liquid which allows the unitary operation of selective absorption of the solvent when brought into contact with the gaseous mixture comprising air and solvent. This absorption liquid may be a liquid mixture comprising an absorption liquid and a solvent, such as the solvent which can be used in the washing chamber 1. In this case the liquid mixture comprising the absorption liquid and a solvent contains a smaller quantity of solvent than the condition where it is saturated with the gaseous mixture comprising air and solvent. Namely the liquid mixture comprising the absorption liquid and a solvent contains less solvent than the condition where it is saturated with the gaseous mixture so that it may absorb solvent from the latter. Preferably, in view of the affinity with the solvent so as to be able to bond to the latter inside the washing chamber 1, the absorption liquid corresponds to the same type of lubricant with which the batch of metal smallware is soiled. Therefore, in the context of the present invention, preferably "absorption liquid" is understood as meaning a lubricant, in particular of the same type as that with which the metal smallware is soiled. Consequently, preferably, the absorption liquid may also be a mixture of lubricant and solvent.

The term "lubricant", in the context of the present disclosure, is understood as meaning an oily fluid which, during use, covers at least partly the metal smallware, or a mixture of oily fluid and metal powder or metal swarf, for example resulting from metal stock-removal machining operations. Preferably, the lubricant which adheres at least partly to the metal smallware, namely the lubricant with which said metal smallware is soiled, is an oily lubricant, more preferably an oil. More preferably, the oil is an organic or synthetic or semi-synthetic oil or a mineral oil, or a mixture of synthetic or semi-synthetic oils. For example, a lubricant which can typically be used is a mixture of Canola oil (CAS: 120962-03-0) and 1-decene, dimer, hydrogenated (CAS: 68649-11-6), for example forming respectively 50-70% of the volume of the mixture and 30-50% of the volume of the mixture. In particular, the lubricant of the aforementioned example may have: a molecular weight of 641 g/mol, density at 20° C. of 0.917 g/cm$^3$ and viscosity at 40° C. of between 25 mm$^2$/s and 22.9 mm$^2$/s.

The term "solvent" is understood, in the context of the present disclosure, as meaning a substance capable of dissolving or breaking up the aforementioned lubricant. Therefore, the solvent which can be used in the apparatus according to the present invention may be any solvent suitable for washing the aforementioned lubricant from the metal smallware. Preferably, the solvent may be a modified alcohol or a hydrocarbon or consist of a mixture of modified alcohols and/or hydrocarbons. For example, a solvent which can be used in the context of the present invention may be 3-butoxy-2-propanol (CAS: 5131-66-8) or possibly a mixture comprising the latter and dipropylene glycol dimethyl ether (CAS: 111109-77-4), up to a maximum of 40% by volume of the solvent.

In particular, the solvent of the aforementioned example may have: a molecular weight of 135 g/mol, density at 20° C. of 0.88 g/cm$^3$ and a boiling range of between 170° C. and 175° C.

From now on in the text, when reference is made to a lubricant or a solvent, reference is made to the same type of lubricant or the same type of solvent which, during use, are present in the washing chamber 1, also when not expressly specified.

According to a preferred aspect of the present invention, the cleaning apparatus 100 may also comprise a discharge outlet or vent 12, said discharge outlet 12 being in fluid communication with the second side 42 of the main absorption column 4 so as to be able discharge, or release or emit, into the atmosphere a gaseous mixture comprising air and solvent.

According to a preferred aspect of the present invention, the main absorption column 4 extends between the first side 41 and the second side 42 along a first main direction of extension. Even more preferably, said first main direction of extension is parallel to the direction of gravity.

According to a further preferred aspect of the present invention, the main absorption column 4 may be configured to generate a counter-flow contact between the gaseous mixture comprising air and solvent and the absorption liquid. In particular, the main absorption column 4 may be configured to generate an upward flow of gaseous mixture comprising air and solvent between the first side 41 and the second side 42 and a downward flow of absorption liquid between the second side 42 and the first side 41. During use, the upward flow of gaseous mixture comprising air and solvent and the downward flow of absorption liquid meet in a counter-flow.

More preferably, the first side 41 may comprise a first gas inlet opening or port 41a for receiving an inkling flow of the gaseous mixture comprising air and solvent received from the suction means 2 and a second liquid output opening or port 41b for discharging the absorption liquid, and the second side 42 may comprise a gas outlet port 42a, for discharging the gaseous mixture, and a liquid inlet port 42b for receiving an incoming flow of the absorption liquid. In other words, the gas inlet port 41a may be in fluid communication with the suction means 2 and the liquid inlet port 42b may be in fluid communication with the supply duct 3. The gas outlet port 42a may be in fluid communication with the discharge outlet of the cleaning apparatus 100.

According to a further preferred aspect of the present invention, the main absorption column 4 may comprise a plurality of packing elements apt to increase the contact area between the gaseous mixture comprising air and solvent and the absorption liquid. The main absorption column 4 may be, namely, of the "packed column" type. In this way, the interaction between the gaseous mixture comprising air and solvent and the absorption liquid may be advantageously promoted.

Furthermore, the packing elements may have what is known in technical jargon as a "minimum wetting rate" (in short MWR) preferably of between 0.5 and 1 $m^3/m^2h$ and more preferably equal to about 0.7 $m^3/m^2h$. For example, the packing elements may comprise 15 mm rings known by the trade name "IMPT" produced by Koch-Glitsch S.r.l.

According to a preferred aspect of the present invention, the cleaning apparatus 100 may also comprise at least one condenser 5 in fluid communication with the suction means 2 and the main absorption column 4. Said condenser 5 may be configured to condense a solvent present in a gaseous mixture comprising air and solvent supplied to it by the suction means 2.

Preferably, the condenser 5 may be hydraulically arranged between the suction means 2 and the main absorption column 4. In other words, the condenser 5 may also be configured to supply this gaseous mixture comprising air and solvent to the main absorption column 4. The gas inlet port 41 of the main absorption column 4 may be in fluid communication with an outlet of the condenser 5. In this way, it is possible to reduce the concentration of solvent in the gaseous mixture comprising air and solvent before supplying the latter to the main absorption column 4. In other words, it is possible to perform preliminary reduction of the solvent in the gaseous mixture comprising air and solvent before the entry of the mixture into the main absorption chamber 4.

Preferably, the condenser 5 may be apt to cool the gaseous mixture comprising air and solvent to a temperature of less than −20° C., even more preferably at least to −30° C. According to a preferred aspect of the present invention, said condenser 5 may be a first condenser 51 and the cleaning apparatus 100 may also comprise a second condenser 52. The second condenser 52 may be in fluid communication with the first condenser 51 so as to receive from the latter a gaseous mixture comprising air and solvent and condense at least part of the solvent contained in it and to supply the main absorption column 4 with this gaseous mixture comprising air and solvent. In other words, the first condenser 51 and the second condenser 52 may be hydraulically connected together in series.

Preferably, the second condenser 52 is identical to the first condenser 51.

According to a preferred aspect of the present invention, the suction means 2 may comprise at least one pump 21. The at least one pump 21 is hydraulically connected to the main finishing column 4 or, if provided, to the first condenser 51 or the second condenser 52. More preferably, the at least one pump 21 may be a first pump, and the suction means 2 may comprise a second pump 22 connected hydraulically in series with the first pump 21. Each of the first pump 21 and the second pump 22, if provided, may be a vane or roots vacuum pump. Preferably, the gaseous mixture comprising air and solvent output by the suction means 2 has a volumetric flowrate in the range of 0.1-30.0 L/s, preferably around 26 L/s. Preferably, the volumetric flowrate of the suction means 2, in particular of the first pump 21 and/or the second pump 22, is not continuous over time but has a typical duration of 30 seconds and is repeated 4-6 times per hour.

According to a preferred aspect of the present invention, the cleaning apparatus 100 may comprise the supply duct 3.

According to a preferred aspect of the present invention, the cleaning apparatus 100 may comprise a main supply tank 6 for the absorption liquid hydraulically connected to, namely in fluid communication with, the supply duct 3 so as to supply the latter with the absorption liquid. Consequently, the main supply tank 6, by means of the supply duct 3, may be connected hydraulically to the second side 42 of the main absorption column 4 so as to supply it with the absorption liquid. In particular, the main supply tank 6 may be hydraulically connected to the liquid inlet port 42b.

Preferably, said main supply tank 6 for the absorption liquid may be a cooling tank, namely a tank provided with a cooling device. In particular, the cooling device may be configured and/or programmed to keep the absorption liquid inside the main supply tank 6 preferably at a temperature below 20° C., more preferably at a temperature below 10° C. and at the most preferably around 5° C. In this way, it is possible to improve the efficiency of the absorption inside the main absorption column 4.

According to a preferred aspect of the present invention, the main supply tank 6 may also be hydraulically connected to, namely is in fluid communication with, the first side 41 of the main absorption column 4. Even more preferably, the main supply tank 6 may be hydraulically connected to the liquid outlet port 41b. In this way, the absorption liquid, which may be in the form of a mixture with the solvent, may be made to recirculate through the main supply tank 6 into the main absorption column 4.

According to a preferred aspect of the present invention, the cleaning apparatus 100 may also comprise a storage tank 7 hydraulically connected to the first side of the main absorption column 4 so as to receive from the latter a liquid mixture comprising absorption liquid and solvent. In fact, when crossing the main absorption column 4, the absorption liquid absorbs part of this solvent from the gaseous mixture comprising air and solvent, thus forming the liquid mixture comprising absorption liquid and solvent. Preferably, the storage tank 7 may be hydraulically connected to the liquid outlet port 41b.

According to a preferred aspect of the present invention, the main supply tank 6 and the storage tank 7 may be in fluid communication with each other so that the absorption liquid, namely the liquid mixture comprising absorption liquid and solvent, is supplied to the main supply tank 6, so as to be supplied from the latter, namely conveyed, back to the main absorption column 4.

According to a preferred aspect of the present invention, the cleaning apparatus 100 may also comprise a stripper 8 which may be configured to separate solvent from an absorption liquid. In other words, the stripper 8 is configured to reduce the concentration of solvent in a liquid mixture comprising absorption liquid and solvent. Preferably, the stripper 8 is configured to reduce the concentration of solvent in a liquid mixture comprising an absorption liquid and solvent down to 1.5-4.5% v/v, more preferably around 2.0% v/v.

Preferably, the stripper 8 may be hydraulically connected to the first side 41 of the main absorption column 4 or, to the storage tank 7 if provided, and to receive from them the absorption liquid, namely the liquid mixture comprising absorption liquid and solvent. In particular, the stripper 8 may be hydraulically connected to the liquid outlet port 41b. Preferably, the stripper 8 may be hydraulically connected to the supply means 3, or to the main storage tank 6, if provided, so as to supply the latter with an absorption liquid, namely a liquid mixture comprising absorption liquid and solvent. In this way, the stripper 8 may be in fluid communication with the supply duct 3, or the main supply tank 6 if provided, so as to supply the latter with a liquid mixture comprising absorption liquid and solvent having a smaller content of solvent than a liquid mixture comprising absorption liquid and solvent which it receives from the main absorption chamber 4 or from the storage tank 7, if provided.

In addition, if the absorption liquid corresponds to the lubricant with which the metal smallware is soiled, the stripper 8 may be preferably hydraulically connected to the washing chamber 1 so as to receive from the latter a liquid mixture comprising absorption liquid, namely lubricant, and solvent. During use, at the end of the washing cycle, a liquid mixture comprising lubricant and solvent, namely a mixture comprising a certain amount of lubricant having a certain amount of solvent dissolved in it, is produced as waste. In this way, advantageously, the solvent is removed, at least partially, from the liquid mixture comprising absorption liquid, i.e. lubricant, and this solvent and this liquid mixture may then be used inside the main absorption chamber 4 in order to perform absorption.

According to a preferred aspect of the present invention, the cleaning apparatus 100 may comprise a finishing absorption column 9, having a first end 91, or first wall, and a second end 92, or second wall, opposite each other. In other words, the first end 91 and the secondi side 92 are facing each other, namely are arranged one opposite the other. The first end 91 is hydraulically connected to the main absorption column 4 so as to receive said gaseous mixture comprising air and solvent and said second side 92 is connected to a finishing supply duct 10 so as to receive absorption liquid from the latter. In other words, the finishing absorption column 9 may be hydraulically connected to, namely in fluid communication with, the main absorption column 4 so as to receive from it a gaseous mixture comprising air and solvent and connected to, in fluid communication with, a finishing supply duct 10 so as to receive an absorption liquid from the latter. The finishing absorption column 9 may be configured to cause an interaction between a gaseous mixture comprising air and solvent supplied by the main absorption column 4 and an absorption liquid supplied by the finishing supply duct 10 so as to perform chemical absorption of a solvent present in the gaseous mixture comprising air and solvent, in the absorption liquid. In other words, the finishing absorption column 9 is, that is, configured to bring into contact with each other the gaseous mixture comprising air and solvent supplied by the main absorption column 4 and the absorption liquid supplied by the finishing supply duct 10 so that material and heat exchanges may occur at the separation interface between the two phases, namely between the gaseous mixture comprising air and solvent and the absorption liquid, so as to obtain physical or chemical absorption of part of the solvent present in the gaseous mixture comprising air and solvent by means of the absorption liquid.

In other words, the finishing absorption column 9 may be hydraulically connected in series with the first main absorption column 4 so as to perform further absorption of the solvent present in the gaseous mixture. Expressed yet differently again, the finishing absorption column 9 may advantageously achieve a further reduction of the solvent present in the gaseous mixture comprising air and solvent which it receives from the main absorption column 4.

Preferably, the finishing absorption column 9 is configured to perform a reduction of the concentration of solvent in a gaseous mixture comprising air and solvent supplied to it, namely input into it, up to a value equal to or less than 20 mg/m$^3$.

Preferably, during use, the finishing supply duct 10 is apt to supply the finishing absorption column 9 with a pure absorption liquid.

In the context of the present invention, the expression "pure absorption liquid" is understood as meaning an absorption liquid which has not been supplied to the main absorption column 4. Preferably, the pure absorption liquid is a mixture of absorption liquid, in particular lubricant, and solvent. Even more preferably, the concentration of solvent in the absorption liquid is equal to or less than 0.1% v/v.

According to a preferred aspect of the present invention, the finishing absorption column 9 extends between the first end 91 and the second end 92 along a second main direction of extension. Even more preferably, in a manner similar to that of the main absorption column, said second main direction of extension D is parallel to the direction of gravity.

According to a preferred aspect of the present invention, the finishing absorption column 9 may be configured to generate a counter-flow contact between the gaseous mixture comprising air and solvent and the absorption liquid. In particular, the main absorption column 9 may be configured to generate an upward flow of gaseous mixture comprising air and solvent between the first end 91 and the second end 92 and a downward flow of absorption liquid between the second end 92 and the first end 91. During use, the upward flow of gaseous mixture comprising air and solvent and the downward flow of absorption liquid meet in a counter-flow.

More preferably, the first end 91 may comprise a gas inlet mouth 91a, for receiving an incoming flow of gaseous mixture comprising air and solvent from the main absorption column 4, in particular from the gas outlet port 42a, and a liquid outlet mouth 91b, for discharging the absorption liquid. More preferably, the second end 92 may comprise a gas outlet port 92a, for discharging the gaseous mixture, which may coincide with the discharge outlet 12 of the cleaning apparatus 100, and a liquid inlet mouth 92b, for receiving an incoming flow of absorption liquid from the finishing supply duct 10. In other words, the gas inlet mouth 91a may be in fluid communication with the main absorption column 4, and in particular with the gas outlet port 42a. The gas outlet port 92a may be in fluid communication with the discharge outlet of the cleaning apparatus 100 or coincide with the latter.

According to a preferred aspect of the present invention, the main absorption column 9 may comprise a plurality of packing elements apt to increase the area of contact between the gaseous mixture comprising air and solvent and the absorption liquid. The main absorption column 9 may be, namely, of the "packed column" type. In this way, the interaction between the gaseous mixture comprising air and solvent and the absorption liquid may be advantageously promoted.

Furthermore, the packing elements may have what is known in technical jargon as a "minimum wetting rate" (in short MWR) preferably of between 0.5 and 1 $m^3/m^2h$ and more preferably equal to about 0.7 $m^3/m^2h$. For example, the packing elements may comprise 15 mm rings known by the trade name "IMPT" produced by Koch-Glitsch S.r.l.

According to a preferred aspect of the present invention, the cleaning apparatus 100 comprises a finishing supply tank 11 hydraulically connected to the finishing supply duct 10 so as to supply it with a pure absorption liquid. Preferably, a finishing supply tank 11 is hydraulically connected to the finishing supply duct 10 in order to supply it with a pure absorption liquid.

Preferably, the finishing tank 11 may be hydraulically connected, via the supply duct 10, to the second end 92 of the finishing absorption column 9, in particular to the liquid inlet mouth 92b.

More preferably, the finishing tank 11 may also be hydraulically connected to the first end 91 of the finishing absorption column 9, in particular to the liquid outlet mouth 91b, so as to receive from the latter a pure absorption liquid, namely a liquid mixture of pure absorption liquid and solvent.

According to a preferred aspect of the present invention, the finishing supply tank 1 may be a cooling tank, namely a tank provided with a cooling device. In particular, the cooling device may be configured and/or programmed to adjust and keep the absorption liquid inside the finishing supply tank 11 preferably at a temperature of less than 20° C. In this way, it is possible to improve the efficiency of the absorption inside the finishing absorption column 9.

According to a preferred aspect of the present invention, the cleaning apparatus 100 may comprise at least one demister, namely a mist eliminator or entrainment separator or droplet separator. Preferably, the cleaning apparatus 100 may comprise at least one first demister, connected to the main absorption column 4, and/or a second demister, connected to the finishing absorption column 9 for reducing the entrainment of droplets of absorption liquid in the gaseous mixture comprising air and solvent comprising lubricant and solvent output respectively from the main absorption column 4 or the finishing absorption column 9. Even more preferably, the first demister may be connected to the second side 42 of the main absorption column 4. Similarly the second demister may be connected to the second side 92 of the finishing absorption column 9. The first demister and/or the second demister may advantageously reduce the entrainment of droplets of absorption liquid in the gaseous mixture comprising air and solvent comprising lubricant and solvent output respectively from the main absorption column 4 and the finishing absorption column 9. In other words, advantageously, the first demister and/or the second demister is therefore able to reduce further the concentration of solvent of the gaseous mixture comprising air and solvent output from the main absorption column 4 or from the finishing absorption column 9.

According to a preferred aspect of the present invention, the height of the main absorption column 4 may be between 100 cm and 205 cm.

According to a preferred aspect of the present invention, the diameter of the finishing absorption column 9 may be between 12 cm and 14 cm, more preferably about 13.5 cm.

According to a preferred aspect of the present invention, the height of the finishing absorption column 9 may be between 25 cm and 70 cm.

According to a preferred aspect of the present invention, the diameter of the main absorption column 4 may be between 12 cm and 14 cm, more preferably about 13.5 cm.

According to a preferred aspect of the present invention, as shown in FIG. 2, it is possible to indicate with Ve and Vu the molar flowrate (mol/s) of gaseous mixture comprising air and solvent respectively entering into and exiting the main absorption column 4; similarly it is possible to indicate with Le and Lu the molar flowrate (mol/s) of liquid mixture comprising lubricant and solvent respectively entering into and exiting the main absorption column 4. In addition the molar fraction, namely the concentration, of solvent in the gaseous mixture comprising air and solvent respectively entering into and exiting the main absorption column, may be indicated by "ye" and "yu"; similarly, "xe" and "xu" indicate the molar fraction, namely the concentration, of solvent in the liquid mixture comprising lubricant and solvent. The same considerations are applicable to the finishing column 9.

The aforementioned parameters may be used, in a manner known to the person skilled in the art, in order to calculate or calibrate differently the height of the main absorption column 4 or the finishing absorption column 9.

The present invention also relates to a method for cleaning metal smallware, intended to clean at least one batch of metal smallware soiled with lubricant. Preferably this cleaning method may be carried using the cleaning apparatus 110 according to the present invention and described hitherto. In the description of this method, the elements of the apparatus involved in the method and having the same function and the same structure as the elements described above retain the same reference number and are not described again in detail.

The cleaning method according to the present invention may comprise a step a), a step b) and a step c) in succession.

A washing step a) for removing at least part of the lubricant from the batch of metal smallware soiled with lubricant, by means of a solvent. At the end of the step a) a gaseous mixture comprising air and solvent is produced as waste product. This step a) may preferably be performed by the washing chamber 1 of the cleaning apparatus 100. Preferably, step a) is performed 4 to 6 times per hour. Preferably, the duration of step a) is about 10-12 minutes. The gaseous mixture produced at the end of the step a) may have a concentration of solvent equal to about 6400 $mg/Nm^3$.

The discharge step b) involves carrying out a discharge cycle in order to suck or draw off the said gaseous mixture comprising air and solvent. Preferably, the suction means 2 may be configured to carry out the discharge cycle according to step b). Step b) may therefore involve sucking the gaseous mixture comprising air and solvent from the washing chamber 4.

The main absorption step c) involves causing an interaction between the gaseous mixture comprising air and solvent and an absorption liquid for performing chemical absorption of the solvent present in the gaseous mixture comprising air and solvent, in said absorption liquid. Preferably, said step c) may be performed by the main absorption column 4.

According to a further preferred aspect of the present invention, step c) involves generating a counter-flow contact between the gaseous mixture comprising air and solvent and the absorption liquid. In particular, in the case where step c) is performed by the main absorption column 4, during step c) an upward flow of gaseous mixture comprising air and solvent is generated in the main absorption column between the first side 41 and the second side 42 and a downward flow of absorption liquid is generated between the second side 42 and the first side 41. During step c), the upward flow of gaseous mixture comprising air and solvent and the downward flow of absorption liquid meet in a counter-flow.

According to a preferred aspect of the present invention, the absorption liquid may comprise or coincide with a lubricant which is of the same lubricant type as that with which the metal smallware is soiled. In other words, given the affinity with the solvent so as to be able to bond to the latter inside the washing chamber 1, the absorption liquid corresponds to the same type of lubricant as that with which the batch of metal smallware is soiled.

Preferably, step c) may also involve increasing the contact surface area between the gaseous mixture comprising air and solvent and the absorption liquid in order to promote the chemical absorption of the solvent by the absorption liquid. As mentioned above, step c) may be performed by the main absorption column 4 which may comprise a plurality of packing elements apt to increase the contact surface area between the gaseous mixture comprising air and solvent and the absorption liquid.

According to a preferred aspect of the present invention, the cleaning method comprises a condensation step d), for condensing at least part of the solvent of the gaseous mixture comprising air and solvent. The condensation step d) may be performed between the discharge step b) and the main absorption step c). In this way, the gaseous mixture comprising air and solvent which undergoes the unitary chemical absorption operation has a concentration of solvent which is less that which would be obtained from step a). In other words, it is possible to reduce the concentration of solvent in the gaseous mixture comprising air and solvent before it is subject to the main absorption step c). Namely step d) allows a preliminary reduction of the concentration of solvent in the gaseous mixture comprising air and solvent upstream, namely before, the main absorption step c).

Preferably, step d) involves cooling the gaseous mixture comprising air and solvent to a temperature below −20° C., even more preferably at least equal to −30° C.

Preferably, the condensation step d) may be performed by the condenser 5.

According to a preferred aspect of the present invention, the condensation step may be performed at least twice consecutively. Preferably, step d) is performed first in a first condenser 51 and then in a second condenser 52.

According to a preferred aspect of the present invention, the cleaning method may also comprise a supply step e), namely a step for supplying or providing the absorption liquid. This step e) may take place upstream of step a). Preferably, the step e) may take place via the supply means 3 and, if provided, from the main supply tank 6.

More preferably, the supply step e) may also comprise reducing and keeping the absorption liquid to/at a temperature below 20° C., more preferably below 10° C. and even better below 5° C. In this way, it is possible to improve the efficiency of the main absorption step c).

According to a preferred aspect of the present invention, the cleaning method may also comprise a storage step f), following step c). The storage step f) involves collecting the absorption liquid output from step c). Step c) involves, namely, accumulating the absorption liquid, namely the liquid mixture comprising absorption liquid, in particular lubricant, and solvent at the end of step c). Preferably, the storage step f) is performed by means of the storage tank 7.

According to a preferred aspect of the present invention, the liquid mixture comprising absorption liquid, in particular lubricant, and solvent collected during the storage step f) may be used as an absorption liquid in step c). Even more preferably the liquid mixture comprising absorption liquid, in particular lubricant, and solvent collected during the storage step f) may be supplied via the supply duct 3 and/or, if provided, by the supply tank, as an absorption liquid into the main absorption chamber 4 in order to perform said step c).

According to a preferred aspect of the present invention, the method may also comprise a stripping or regeneration step h) for separating the solvent from the lubricant. In other words, step h) may involve reducing the concentration of solvent in the liquid mixture comprising absorption liquid, in particular lubricant, and solvent. Said liquid mixture comprising lubricant and solvent is, that is, a waste product of the washing cycle. Preferably, said step h) may take place following the storage step f). Preferably, step h) is performed by means of a stripper 8. Preferably, at the end of step h), the solvent content in the liquid mixture comprising absorption liquid, in particular lubricant, and solvent is between 1.5% v/v and 4.5% v/v and more preferably about 2.0% v/v. According to a preferred aspect of the present invention, at the end of the washing step a), a liquid mixture comprising lubricant and solvent may be produced.

According to a preferred aspect of the present invention, the method may also comprise a release step i), namely a step of releasing or emitting into the atmosphere the gaseous mixture comprising air and solvent. This step may take place following step c), or where envisaged, following step g).

According to a preferred aspect of the present invention, the supply step e) may take place following step h). In other words, in this case, the supply step involves supplying a liquid mixture comprising absorption liquid, in particular lubricant, and solvent which has undergone stripping.

According to a preferred aspect of the present invention, the cleaning method may also comprise a finishing absorption step g), following the main absorption step c). The finishing absorption step g) causes an interaction between the gaseous mixture comprising air and solvent output from step c) and an absorption liquid for performing chemical absorption of the solvent present in the gaseous mixture comprising air and solvent output from step c), in the absorption liquid. In other words, the finishing absorption step g) involves subjecting the gaseous mixture comprising air and solvent which has undergone chemical absorption during the main absorption step c), to a further unitary chemical absorption operation by means of an absorption liquid. Preferably, step g) is performed by a finishing absorption column 9.

Preferably, the absorption liquid used in step g) is a pure absorption liquid. In the context of the present invention, the expression "pure absorption liquid" is understood as meaning an absorption liquid which is not used in the main absorption step c). Preferably, the finishing absorption step g) is performed by the finishing absorption column 9 and the absorption liquid used during the finishing absorption step g) is supplied by the finishing supply tank 11. Even more preferably, the absorption liquid output from the finishing absorption step g) is collected inside the finishing supply tank 11. In other words, during step g), the pure absorption liquid is recirculated between the finishing supply tank 11 and the finishing absorption column 9. Preferably, the pure absorption liquid is a mixture of absorption liquid, in particular lubricant, and solvent. Even more preferably, the concentration of solvent in the absorption liquid is equal to or less than 0.1% v/v.

The present invention has been described hitherto with reference to a preferred embodiment thereof. It is to be understood that other embodiments which have in common with the embodiment described here the same inventive idea may exist, as defined within the scope of protection of the claims which are illustrated hereinbelow.

The invention claimed is:

1. A cleaning apparatus for metal smallware comprising:
   a washing chamber apt to receive a solvent and a batch of metal smallware soiled with a lubricant and configured to carry out a washing cycle to remove at least part of the lubricant from the batch of metal smallware soiled with the lubricant, by means of the solvent;
   suction means connected to said washing chamber and configured to carry out a discharge cycle by sucking a gaseous mixture comprising air and the solvent from said washing chamber;
   a main absorption column having a first side and a second side opposite each other, wherein said first side is hydraulically connected to said suction means to receive the gaseous mixture from said suction means and said second side is hydraulically connected to a supply duct to receive an absorption liquid from said supply duct, wherein said main absorption column is configured to cause an interaction between the gaseous mixture received from said suction means and the absorption liquid received from said supply duct to perform chemical absorption of a fraction of the solvent present in the gaseous mixture in the absorption liquid; and
   a stripper connected to said washing chamber to receive from said washing chamber a liquid mixture comprising the lubricant and the solvent and configured to separate the lubricant from the solvent, wherein said stripper is in fluid communication with said supply duct directly in order to supply said supply duct with the lubricant separated by said stripper.

2. The cleaning apparatus according to claim 1, further comprising a condenser in fluid communication with said suction means and said main absorption column, wherein said condenser is configured to condense the solvent present in the gaseous mixture.

3. The cleaning apparatus according to claim 1, further comprising a main supply tank for the absorption liquid, hydraulically connected to said supply duct to supply said supply duct with the absorption liquid.

4. The cleaning apparatus according to claim 1, further comprising a finishing absorption column having a first end and a second end opposite each other, and wherein said first end is connected hydraulically to said main absorption column to receive said gaseous mixture from said main absorption column and said second end is connected to a finishing supply duct to receive the absorption liquid from said finishing supply duct;
   wherein said finishing absorption column is configured to cause an interaction between the gaseous mixture received from said main absorption column and the absorption liquid received from said finishing supply duct to perform chemical absorption of the solvent present in the gaseous mixture in the absorption liquid.

5. A cleaning apparatus for metal smallware comprising:
   a washing chamber apt to receive a solvent and a batch of metal smallware soiled with a lubricant and configured to carry out a washing cycle to remove at least part of the lubricant from the batch of metal smallware soiled with the lubricant, by means of the solvent;
   suction means connected to said washing chamber and configured to carry out a discharge cycle by sucking a gaseous mixture comprising air and the solvent from said washing chamber;
   a main absorption column having a first side and a second side opposite each other, wherein said first side is hydraulically connected to said suction means to receive the gaseous mixture from said suction means and said second side is hydraulically connected to a supply duct to receive an absorption liquid from said supply duct, wherein said main absorption column is configured to cause an interaction between the gaseous mixture received from said suction means and the absorption liquid received from said supply duct to perform chemical absorption of a fraction of the solvent present in the gaseous mixture in the absorption liquid;
   a main supply tank for the absorption liquid, hydraulically connected to said supply duct to supply said supply duct with the absorption liquid; and
   a stripper connected to said washing chamber to receive from said washing chamber a liquid mixture comprising the lubricant and the solvent and configured to separate the lubricant from the solvent, wherein said stripper is in fluid communication with said supply duct via said main supply tank to supply said main supply tank with the lubricant separated by said stripper.

* * * * *